United States Patent
Tryding

(10) Patent No.: US 7,626,540 B2
(45) Date of Patent: Dec. 1, 2009

(54) SYSTEM AND METHOD FOR PROVIDING LOCATION ASSISTANCE DATA USING A RADIO TRANSMISSION

(75) Inventor: Sven Tryding, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 12/025,908

(22) Filed: Feb. 5, 2008

(65) Prior Publication Data

US 2009/0195447 A1 Aug. 6, 2009

(51) Int. Cl.
*G01S 1/02* (2006.01)
*G01C 21/00* (2006.01)

(52) U.S. Cl. .............. 342/357.09; 342/357.06; 701/213

(58) Field of Classification Search ............ 342/357.01, 342/357.06, 357.09, 357.15; 701/207, 213, 701/215
See application file for complete search history.

(56) References Cited

U.S. PATENT DOCUMENTS 6,018,313 A 1/2000 Engelmayer et al.

2003/0134646 A1 7/2003 Forrester
2007/0109185 A1 5/2007 Kracke et al.

FOREIGN PATENT DOCUMENTS

WO 01/78436 10/2001
WO 2006/117198 11/2006

OTHER PUBLICATIONS

International Search Report and Written Opinion for corresponding International Application No. PCT/IB2008/001964 dated Jan. 30, 2009.

*Primary Examiner*—Dao L Phan
(74) *Attorney, Agent, or Firm*—Renner, Otto, Boisselle & Sklar, LLP

(57) ABSTRACT

The following discloses an improved system and method for accessing location assistance data, such as A-GPS assistance data, with a portable electronic device. In exemplary embodiments, location assistance data is generated by one or more reference radio transmitters and continuously broadcasted therefrom. In a preferred embodiment, the location assistance data may be continuously broadcasted in the form of an RDS feed associated with a broadcasted FM radio station. The location assistance data may include such items of information as satellite ephemeris data, approximate location, and current time. The location assistance data may be received by a radio receiver within the portable electronic device. A controller within the portable electronic device may combine the assistance data with location data received from satellites to enhance the generation of location information.

20 Claims, 3 Drawing Sheets

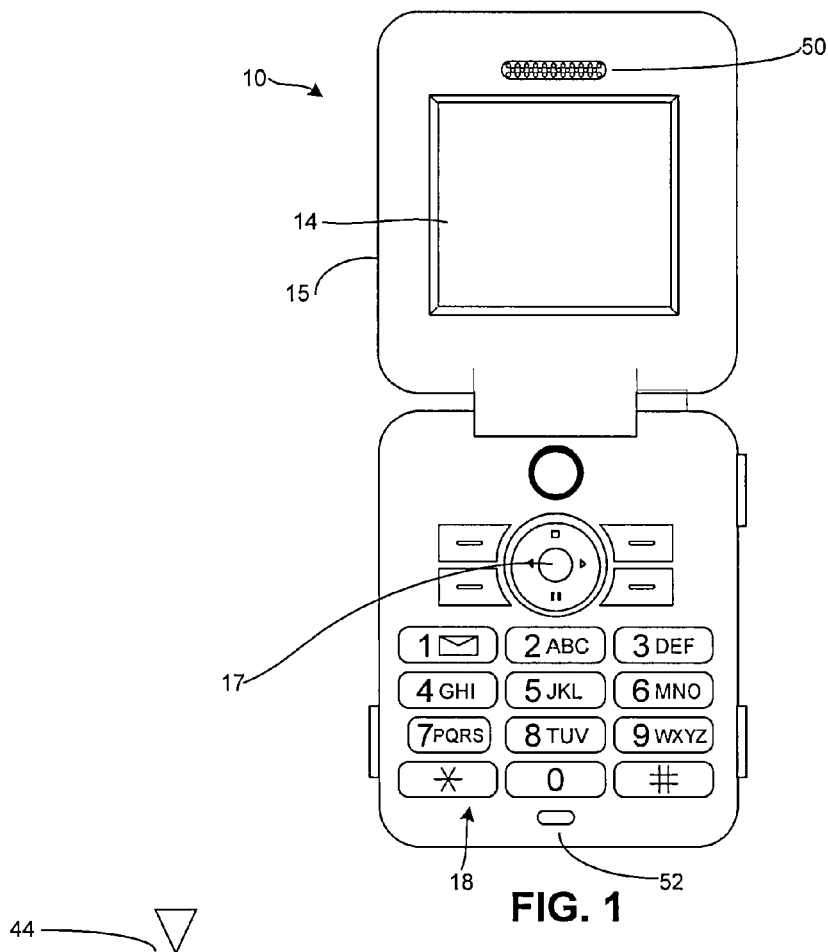
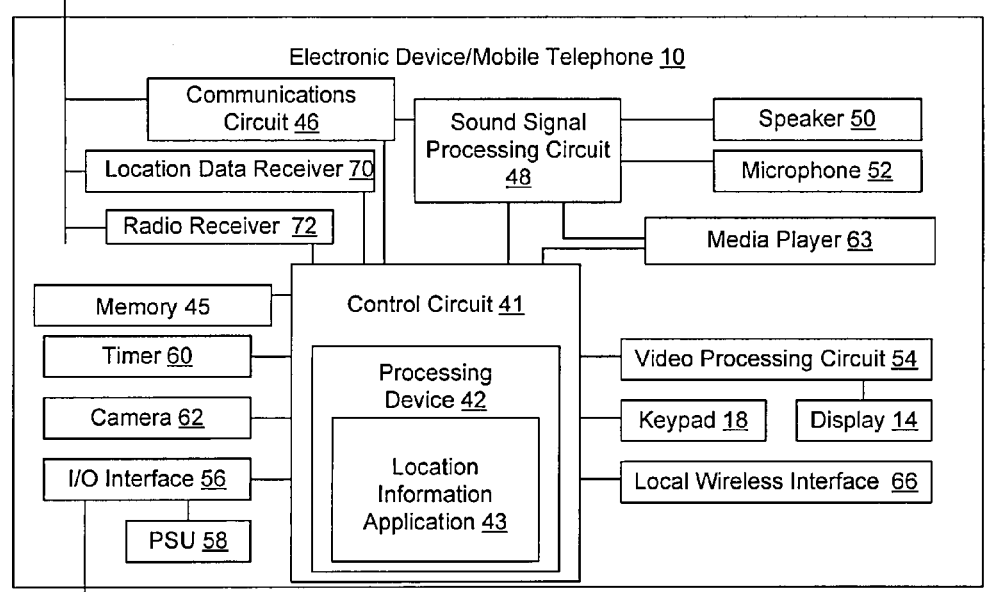

SYSTEM AND METHOD FOR PROVIDING LOCATION ASSISTANCE DATA USING A RADIO TRANSMISSION

TECHNICAL FIELD OF THE INVENTION

The technology of the present disclosure relates generally to portable electronic devices, and more particularly to a system and method by which portable electronic devices may receive location assistance data by radio transmission.

DESCRIPTION OF THE RELATED ART

Portable electronic devices increasingly are being equipped with a navigation function. One commonly used navigation system for providing location information is the Global Positioning System, or GPS, initially developed for the United States military. GPS is now widely used around the world as a navigational tool for determining such location information as a user's three-dimensional location, speed of movement, direction of movement, and local time. Other regions and nations, such as the European Union, China, and India, are developing comparable location information systems.

Portable electronic devices, such as mobile telephones, media players, personal digital assistants (PDAs), and others, are ever increasing in popularity. To avoid having to carry multiple devices, portable electronic devices are now being configured to provide a wide variety of functions. For example, a mobile telephone may no longer be used simply to make and receive telephone calls. A mobile telephone may also be a camera, an Internet browser for accessing news and information, an audiovisual media player, a messaging device (text, audio, and/or visual messages), a gaming device, a personal organizer, and have other functions as well. Such devices also may include a GPS or comparable navigation function.

As is known in the art, the GPS and comparable navigation systems employ multiple satellites to calculate a user's location and other directional and time information. Each satellite transmits navigation messages containing location data to a GPS receiver, and a user's position and other location information are calculated from the satellite navigation messages. Typically, a GPS receiver communicates with a minimum of four satellites to determine a user's three-dimensional position and local time, although more complex receivers may communicate with additional satellites if within the signal reception range of the receiver. A typical GPS receiver includes an antenna tuned to the transmission frequencies of the satellites, and has or is associated with a processor for processing the navigation messages received from the multiple satellites to calculate the location information. A receiver also may include or be in communication with one or more output devices. Output devices may include a display for displaying location information to the user, often in the form of visual maps and/or directions. A receiver also may include audio functionality to communicate location information and/or directions to a user verbally.

Also as is known in the art, one component of a satellite navigation message is ephemeris data regarding the satellite's precise orbital position. The ephemeris data has a relatively low transmission rate and may cause a delay of as much as thirty seconds in determining a first position once a typical GPS receiver is activated. The delay associated with acquiring ephemeris data remains an inconvenience in using GPS and similar navigation systems. Furthermore, deficient reception of navigation messages generally may result from poor weather conditions, interference by tall buildings or prominent geographical features, and the like. Such conditions also may exacerbate any delays associated with the initial acquisition of ephemeris and/or other satellite information.

Accordingly, to enhance GPS performance, Assisted GPS systems, also known as A-GPS, have been developed. Generally, an A-GPS receiver communicates with a device in addition to the satellites, such as a network server, to improve GPS performance. The network server may aid performance by, for example, roughly locating the user and/or providing an improved link to the satellites. The additional information provided via the networked device or server is commonly referred to as location assistance data (or simply assistance data), which is used in combination with the satellite navigation messages to improve performance.

In conventional A-GPS systems, mobile devices, such as mobile telephones, communicate with networked location information servers pursuant to established communications and Internet protocols collectively referred to as the Internet protocol suite (also referred to as TCP/IP). A known communication protocol for providing location assistance data in A-GPS systems is the Secure User Plane for Location (SUPL) protocol. Generally, SUPL is a standards-based protocol that permits a mobile handset client to communicate with a location server. Location assistance data commonly is distributed to mobile telephones via the SUPL protocol on top of TCP/IP. Transmission of A-GPS data in accordance with these or comparable communication protocols requires a complex, networked infrastructure of location information servers and cooperating components installed into mobile devices. As with other forms of TCP/IP communications, conventional A-GPS systems often require a user to log on or otherwise access the network through connection via a public IP address. User connection efforts may introduce another source of delay in acquiring location assistance data. Accordingly, the extensiveness and complexity of conventional A-GPS networks may introduce unfavorable expenses and additional delays in furnishing location assistance data to mobile telephones.

Heretofore unrelated to the communication of location assistance data, there is known in art a system for continuously broadcasting data known as the Radio Data System (RDS). Developed as a European standard (which is now used in other regions as well), a comparable system also currently operates in the United States (sometimes referred to as the Radio Broadcast Data System or RBDS). RDS broadcasts commonly are used to broadcast music or other audio signals over typical radio frequencies, and FM radio frequencies in particular. RDS broadcasts may incorporate information about the music or other audio, such as a song title or artist. A radio or other music player that is RDS capable may display the RDS information on a display as a song or other audio is played. Continuous RDS broadcasts are widely available and inexpensive to generate and receive, but RDS broadcasts have not been used to their full potential.

SUMMARY

To improve the consumer experience with portable electronic devices, there is a need in the art for an improved system and method for accessing location assistance data, such as A-GPS assistance data, without the delays and expenses commonly associated with current GPS and/or A-GPS systems. In exemplary embodiments, location assistance data is generated as by one or more reference radio transmitters and continuously broadcasted therefrom. In a preferred embodiment, the location assistance data may be continuously broadcasted in the form of an RDS feed associated with a particular broadcasted radio station, such as an FM radio station. The location assistance data may include, for example, such items of information as satellite ephemeris data, approximate location, and current time. The location assistance data may be received by a radio receiver within the portable electronic device. A controller within the portable electronic device may combine the location assistance data with location data received from satellites to enhance and accelerate the generation of location information.

Therefore, according to one aspect of the invention, an electronic device comprises a location data receiver for receiving location data from at least one satellite, a radio receiver for receiving a continuously broadcasted radio transmission of assistance data from at least one radio transmitter, and a controller, wherein the controller combines the location data and the assistance data to calculate location information relating to the electronic device.

According to one embodiment of the electronic device, the location data receiver is a Global Positioning System (GPS) receiver.

According to one embodiment of the electronic device, the radio receiver includes a Radio Data System (RDS) receiver for receiving an RDS feed associated with a continuously broadcasted FM radio station.

According to one embodiment of the electronic device, the electronic device is a mobile telephone.

According to one embodiment of the electronic device, the location information comprises at least one of the electronic device's three-dimensional position, direction of movement, speed of movement, or local time.

Accordingly to another aspect of the invention, a navigation system comprises a plurality of satellites for transmitting location data and at least one radio transmitter comprising a first location data receiver for receiving location data from the plurality of satellites, wherein the radio transmitter continuously broadcasts a radio transmission of assistance data based on the location data received from the plurality of satellites. The navigation system further comprises an electronic device comprising a second location data receiver for receiving location data from the plurality of satellites, a radio receiver for receiving the continuously broadcasted radio transmission of assistance data from the at least one radio transmitter, and a controller, wherein the controller combines the location data and the assistance data to calculate location information relating to the electronic device.

According to one embodiment of the navigation system, the first location data receiver and the second location data receiver are Global Positioning System (GPS) receivers.

According to one embodiment of the navigation system, the at least one radio transmitter further comprises a Radio Data System (RDS) transmitter, and the radio transmitter transmits the assistance data as an RDS feed associated with a continuously broadcasted FM radio station. The radio receiver of the electronic device includes an RDS receiver for receiving the RDS feed of assistance data from the at least one radio transmitter.

According to one embodiment of the navigation system, the electronic device is a mobile telephone.

According to one embodiment of the navigation system, the location information comprises at least one of the electronic device's three-dimensional position, direction of movement, speed of movement, or local time.

According to one embodiment of the navigation system, the at least one radio transmitter comprises a plurality of radio transmitters.

According to one embodiment of the navigation system, the radio receiver of the electronic device receives a continuously broadcasted radio transmission of assistance data from the radio transmitter for which a strongest signal is detected by the radio receiver as compared to transmission signals of the others of the plurality of radio transmitters.

According to one embodiment of the navigation system, the radio receiver of the electronic device receives a continuously broadcasted radio transmission of assistance data from each of the plurality of radio transmitters within a signal reception range of the radio receiver.

Another aspect of the invention is a method of generating location information relating to an electronic device comprising the steps of receiving location data from a plurality of satellites, receiving a continuously broadcasted radio transmission of assistance data from at least one radio transmitter, combining the location data received from the plurality of satellites and the assistance data received from the radio transmitter, and calculating location information relating to the electronic device from the combined location data and assistance data.

According to one embodiment of the method of generating location information, the received continuously broadcasted radio transmission of assistance data from the at least one radio transmitter is a Radio Data System (RDS) feed associated with a continuously broadcasted FM radio station.

According to one embodiment of the method of generating location information, the at least one radio transmitter comprises a plurality of radio transmitters. The step of receiving a continuously broadcasted radio transmission of assistance data further comprises scanning a signal reception range of the electronic device for radio transmitters located within the signal reception range, determining which of the plurality of radio transmitters has a strongest transmission signal as compared to transmission signals of the others of the plurality of radio transmitters, and receiving the radio transmission of the assistance data from the radio transmitter having the strongest transmission signal.

According to one embodiment of the method of generating location information, the at least one radio transmitter comprises a plurality of radio transmitters. The step of receiving a continuously broadcasted radio transmission of assistance data further comprises scanning a signal reception range of the electronic device for radio transmitters located within the signal reception range, receiving a radio transmission of assistance data from each radio transmitter that is located within the signal reception range, and combining the assistance data received from the radio transmitters.

According to one embodiment of the method of generating location information, the assistance data includes ephemeris data relating to orbital positions of the plurality of satellites.

According to one embodiment of the method of generating location information, the step of calculating the location information comprises calculating least one of the electronic device's three-dimensional position, direction of movement, speed of movement, or local time.

According to one embodiment of the method of generating location information, the method further comprises outputting the location information to an output device.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

BRIEF DESCRIPTION OF THE DRAWINGS

FIG. 1 is a schematic view of a mobile telephone as an exemplary electronic device for use in accordance with an embodiment of the present invention.

FIG. 2 is a schematic block diagram of operative portions of the mobile telephone of FIG. 1.

DETAILED DESCRIPTION OF EMBODIMENTS

Figure 3:
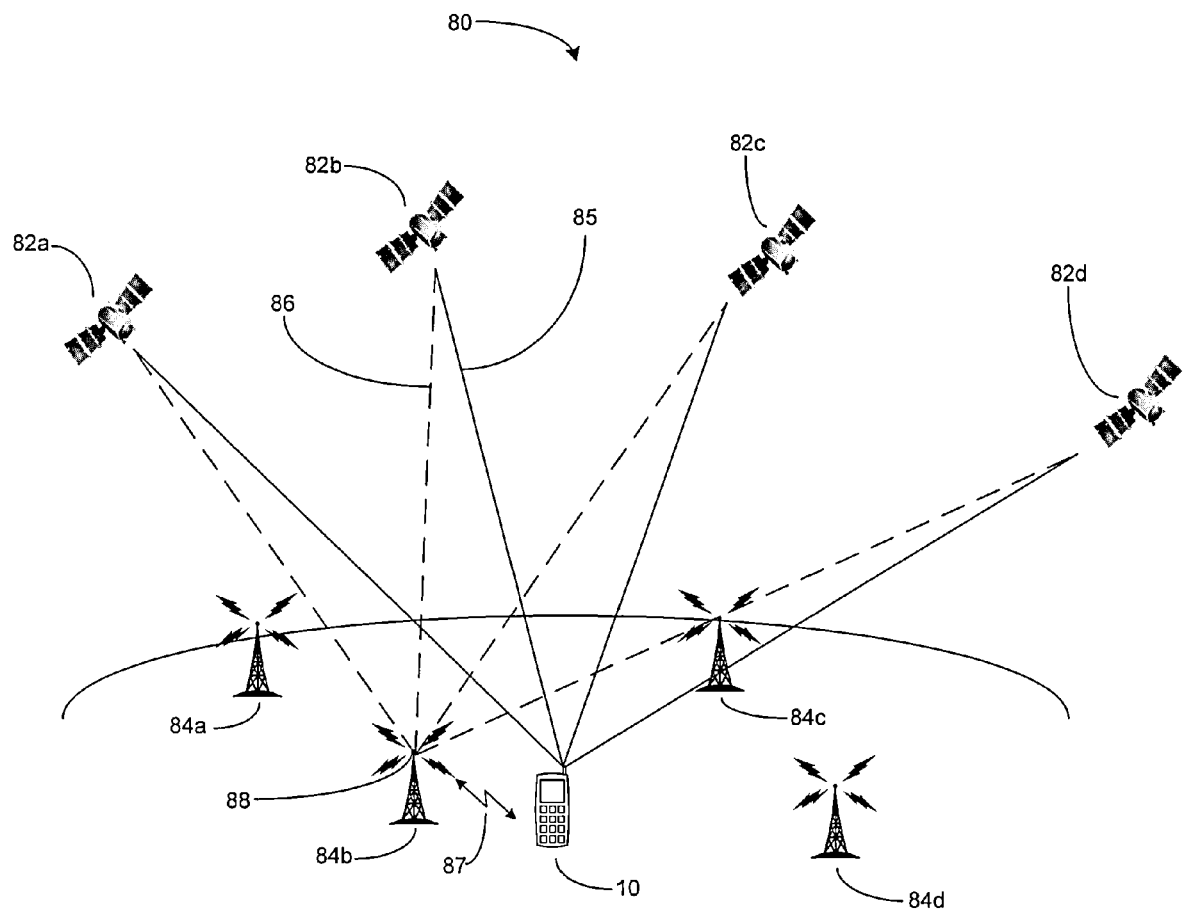
FIG. 3 is schematic diagram of a navigation system for us in accordance with an embodiment of the present invention.

The present invention provides a user of a portable electronic device with an improved system and method for accessing location assistance data, such as location assistance data for use in an A-GPS system. In exemplary embodiments, location assistance data is generated by one or more reference radio transmitters and continuously broadcasted therefrom. In a preferred embodiment, the location assistance data may be continuously broadcasted in the form of an RDS feed associated with a particular broadcasted radio station, such as an FM radio station. The location assistance data may include, for example, such items of information as satellite ephemeris data, approximate location, and current time. The location assistance data may be received by a radio receiver within the portable electronic device. A location data receiver, such as a GPS receiver, within the portable electronic device may receive location data from a plurality of satellites. A controller may combine the location assistance data received from a radio transmitter with location data received from the satellites to enhance and accelerate the generation of location information.

Embodiments of the present invention will now be described with reference to the drawings, wherein like reference numerals are used to refer to like elements throughout. It will be understood that the figures are not necessarily to scale.

The following description is made in the context of a conventional mobile telephone. It will be appreciated that the invention is not intended to be limited to the context of a mobile telephone and may relate to any type of appropriate electronic device, examples of which include a media player, a gaming device, or a desktop or laptop computer. For purposes of the description herein, the interchangeable terms "electronic equipment" and "electronic device" also may include portable radio communication equipment. The term "portable radio communication equipment," which sometimes herein is referred to as a "mobile radio terminal," includes all equipment such as mobile telephones, pagers, communicators, electronic organizers, personal digital assistants (PDAs), smartphones, and any communication apparatus or the like.

FIG. 1 depicts an exemplary mobile telephone 10. Mobile telephone 10 may be a clamshell phone with a flip-open cover 15 movable between an open and a closed position. In FIG. 1, the cover is shown in the open position. It will be appreciated that mobile telephone 10 may have other configurations, such as a "block" or "brick" configuration.

FIG. 2 represents a functional block diagram of the mobile telephone 10. The mobile telephone 10 may include a primary control circuit 41 that is configured to carry out overall control of the functions and operations of the mobile telephone 10. The control circuit 41 may include a processing device 42, such as a CPU, microcontroller or microprocessor.

Among their functions, to implement the features of the present invention, the control circuit 41 and/or processing device 42 may comprise a controller that may execute program code stored on a machine-readable medium embodied as the location information application 43. Application 43 may be a stand-alone software application or form a part of a software application that carries out additional tasks related to the mobile telephone 10. It will be apparent to a person having ordinary skill in the art of computer programming, and specifically in application programming for mobile telephones, servers or other electronic devices, how to program a mobile telephone to operate and carry out logical functions associated with the location information application 43. Accordingly, details as to specific programming code have been left out for the sake of brevity. Also, while the code may be executed by control circuit 41 in accordance with exemplary embodiments, such controller functionality could also be carried out via dedicated hardware, firmware, software, or combinations thereof, without departing from the scope of the invention.

The mobile telephone 10 may include an antenna 44 coupled to a communications circuit 46. The communications circuit 46 may include call circuitry that enables the mobile telephone 10 to establish a call and/or exchange signals with a called/calling device, typically another mobile telephone or landline telephone, or another electronic device. The communications circuit 46 also may be configured to transmit, receive, and/or process data such as text messages, often referred to as "SMS" (which stands for short message service) messages. The communications circuit 46 also may be configured to transmit, receive, and/or process electronic mail messages, multimedia messages (e.g., colloquially referred to by some as "an MMS," which stands for multimedia message service), image files, video files, audio files, ring tones, streaming audio, streaming video, data feeds (including podcasts) and so forth. Processing such data may include storing the data in a memory 45, executing applications to allow user interaction with data, displaying video and/or image content associated with the data, outputting audio sounds associated with the data and so forth. The mobile telephone 10 further includes a sound signal processing circuit 48 for processing audio signals transmitted by and received from the communications circuit 46. Coupled to the sound processing circuit 48 are a speaker 50 and microphone 52 that enable a user to listen and speak via the mobile telephone 10 as is conventional.

Mobile telephone 10 also includes a location data receiver 70 coupled to the antenna 44. The location data receiver may be a GPS receiver or a comparable receiver for use in a satellite-based navigation system. Mobile telephone 10 also includes a radio receiver 72 coupled to the antenna 44. As further described below, the radio receiver 72 may receive continuous radio broadcasts containing location assistance data to aid in calculating a user's location information. In FIG. 2, the communications circuit 46, location data receiver 70, and radio receiver 72 are depicted as sharing a common antenna 44. It will be appreciated that such a configuration is exemplary, and other configurations of these components may be employed without departing from the scope of the invention. For example, one or more components may be coupled to a distinct antenna. In addition, although these components are depicted as separate functional blocks, one or more of these functions may be incorporated into a common component.

FIG. 3 is a schematic diagram of a portion of an exemplary navigation system 80 in accordance with an embodiment of the present invention. The system includes satellites 82 and reference radio transmitters 84. As further described below, the satellites and radio transmitters are in signal communication with a user's portable electronic device, such as the mobile telephone 10. In the portion of the system depicted in FIG. 3, four satellites 82*a-d* and four reference radio transmitters 84*a-d* are depicted as representative of components within the signal reception range of the user's mobile telephone 10. It will be appreciated that the figure is an example and a different number of satellites and/or radio transmitters may be in the signal reception range of the user. In addition, although, as stated above, communication with four satellites is typical in GPS systems, communication with more than four satellites may be accomplished with more sophisticated location data receivers. Furthermore, it will be appreciated that the entire navigation system may include additional satellites and radio transmitters (not shown) beyond the signal reception range of the user's current location to provide substantially global coverage of the system.

In FIG. 3, solid lines 85 represent the communication of navigation messages containing location data from the satellites to the user's mobile telephone, as may be performed in a conventional GPS system. A location data receiver, such as a GPS receiver, may receive the navigation messages (and corresponding location data) from which location information may be calculated. The location information may include the user's three-dimensional position (latitude, longitude, and altitude), as well as the local time. The location information also may include such information as the user's direction and speed of movement.

To provide an assisted location information system, such as an A-GPS system, in an exemplary embodiment navigation messages also may be transmitted from the satellites to one or more participating reference radio transmitters 84. In this embodiment, each participating radio transmitter is equipped with a location data receiver 88 for receiving the navigation messages. In FIG. 3, the transmission of navigation messages from the satellites to a participating radio transmitter is represented by the dashed lines 86. The location data receiver 88 of a participating radio transmitter may generate assistance data based on the navigation messages, and the assistance data may then be transmitted as a continuous radio broadcast. The continuous radio broadcast may be received by any mobile telephone 10 that comes within the signal range of the radio transmitter. It will be appreciated that as a continuous broadcast, the radio transmitter transmits even when no mobile telephone or other receiver is in range.

By providing a continuous radio broadcast, typical delays associated with acquisition of initial position may be reduced because a mobile telephone receives the assistance data immediately upon entering the signal reception range. In contrast to conventional TCP/IP based systems, the system of the current invention does not require user log on or other access via a public IP address. As a continuous system, transmission and user reception occurs whenever a user device enters the range of a participating radio transmitter.

The continuous transmission of the assistance data from a radio transmitter to the mobile telephone is represented by the jagged arrow 87. In a preferred embodiment, the continuous broadcast of the assistance data is in the form of an RDS feed broadcasted over an FM radio station. Other forms of continuous broadcast transmission, such as AM radio or television broadcasts, may alternatively be employed. As further described below, the mobile telephone may be configured to combine location data received from the satellites with assistance data received from a radio transmitter to enhance the efficiency of the calculation of the location information.

The assistance data may take a variety of forms. For example, a mobile telephone user may wish to switch from a calling mode to a navigation mode. As stated above, there typically is a delay in calculating a first position, such as a delay due to slow transmission of ephemeris data from the satellites. Note, however, that transmission from the satellites to a participating radio transmitter is continuous and occurs whether or not a user has activated a personal device's navigation function. Accordingly, location data from the satellites, including ephemeris data, already exists at the radio transmitter. Furthermore, as the satellites move, the ephemeris and other satellite data may be updated automatically. Such data may be immediately and continuously broadcasted, for example in an RDS FM radio feed, to the user's mobile device, thereby reducing the typical delays in calculating a first position.

As another example, atmospheric and/or geographical conditions may interfere with the satellite reception of a portable electronic device. A radio transmitter, typically being substantially larger and more powerful, is less subject to interferences. Location data, therefore, may be obtained from the satellites by the radio transmitter and continuously broadcasted to the user's portable electronic device even when the satellite reception is otherwise deficient. The assistance data may provide an additional source of location data to compensate for deficiencies in data from the satellites due to poor reception. Along this vein, the typical range of an FM radio transmitter is about ten to fifty miles. The location of the radio transmitter itself, therefore, represents an approximate user location at a corresponding local time. The time calculation may be enhanced to reduce any lags by referencing a transmitted time value to a known feature of an RDS frame to make the time calculation more accurate. Such approximate information, when combined with the satellite location data, enhances the efficiency of the calculation of more specific location information.

In addition, in most locations radio transmitters, including radio transmitters that can broadcast RDS feeds over FM stations, are readily present. Accordingly, the radio transmission of assistance data, and via an RDS feed in particular, is relatively efficient and inexpensive as compared to prior art A-GPS and similar systems. In particular, the use of continuously broadcasted radio transmissions obviates the need for complex Internet-based or comparable networks of location data servers.

In FIG. 3, the transmission of assistance data is depicted as originating from a single reference radio transmitter to the mobile telephone. More than one participating radio transmitter, however, may be in the signal reception range of the user. In one embodiment, the radio receiver of the mobile telephone may scan over its signal reception range to determine which radio transmitter is transmitting the strongest radio signal as compared to the signals from the other transmitters. The radio receiver then may receive a continuously broadcasted radio transmission of assistance data only from the radio transmitter broadcasting the strongest signal. Alternatively, the mobile telephone may be programmed with a formula to receive and combine assistance data transmitted from more than one participating radio transmitter within the signal reception range. In one embodiment, the transmitter with the strongest signal may act as a primary station for supplying the assistance data. The primary station transmitter additionally may identify other nearby transmitters and calculate or provide a better estimate of user location.

Figure 4:
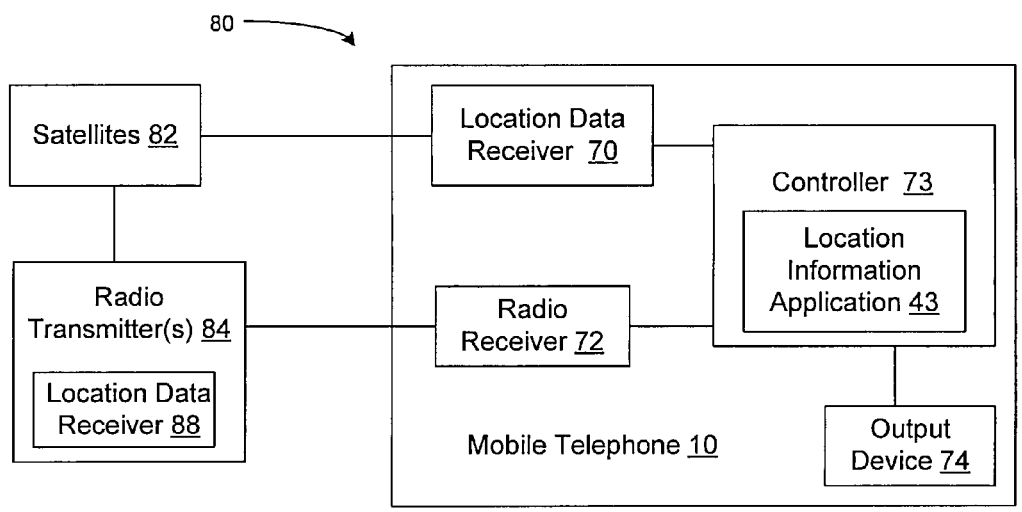
FIG. 4 is a schematic block diagram of a navigation system for use in accordance with an embodiment of the present invention.

FIG. 4 is a schematic block diagram of a portion of a navigation system 80 comparable to that depicted in FIG. 3. Satellites 82 may be in signal communication with a location data receiver 70 located within the mobile telephone 10. The satellites 82 also may be in signal communication with one or more radio transmitters 84 having a location data receiver 88. In this manner, navigation messages containing location data may be transmitted from the satellites to both the user's mobile telephone and the participating radio transmitters. At the radio transmitter, the satellite location data may be used to generate the location assistance data. One or more radio transmitters 84 also may be in signal communication with a radio receiver 72 within the mobile telephone 10. In this manner, assistance data may be continuously broadcasted from the radio transmitter to the mobile telephone in the manner described above.

Satellite location data received by the location data receiver 70 and assistance data received by the radio receiver 72 may be fed into a controller 73 within the mobile telephone 10. Controller 73 may execute program code embodied as location information application 43 to combine the location data and the assistance data. Application 43 may then calculate the specific location information which, as stated above, may include such items of information as the user's three-dimensional position, speed and direction of movement, local time, and the like. The location information may be outputted to an output device 74, such as a display and/or speaker system. In FIG. 4, the output device is depicted as being part of the mobile telephone 10. It will be appreciated that the output device may alternatively or additionally include one or more external devices, such as, for example, a computer display, a dashboard automobile display, an external speaker system, or the like.

Figure 5:
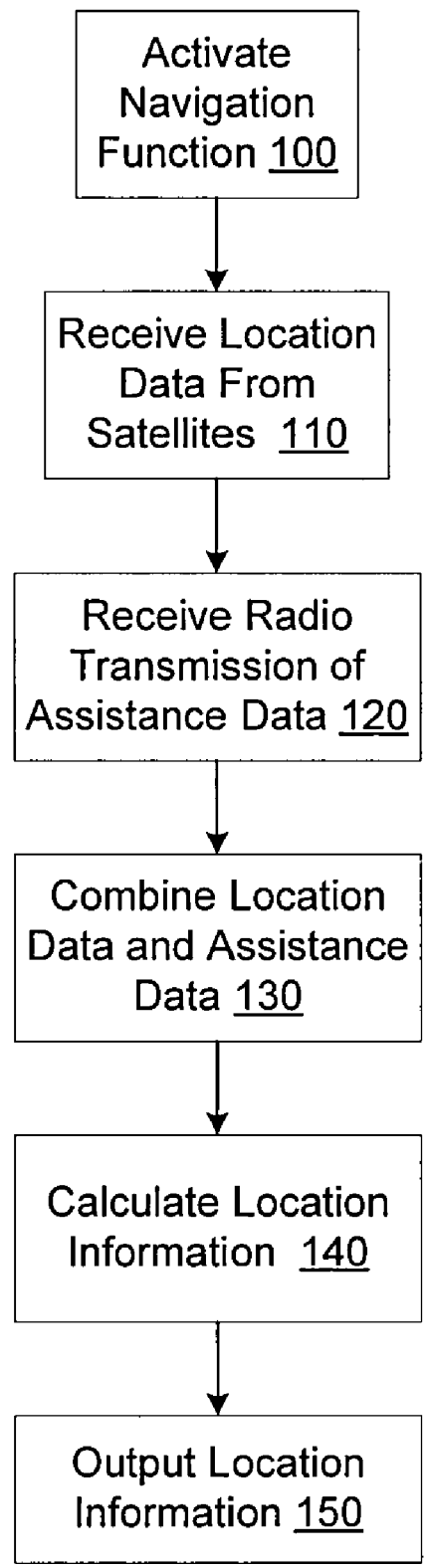
FIG. 5 is a flowchart depicting an exemplary method of generating location information with an electronic device in accordance with an embodiment of the present invention.

FIG. 5 is a flow chart depicting an exemplary method by which location information may be generated by a portable electronic device. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method may begin at step 100 with a user activating the disclosed navigation function within a portable electronic device, such as a mobile telephone. The navigation function may be selected from a conventional menu system or by other known means. At step 110, the electronic device may receive location data from system satellites in the form of navigation messages. At step 120, the electronic device may receive a continuously broadcasted radio transmission containing assistance data from one or more radio transmitters, as described above. The assistance data may be continuously broadcasted as an RDS feed associated with an FM radio station transmission, and received by the mobile telephone when the telephone enters the signal reception range. It will be appreciated that the receiving steps 110 and 120 may be performed simultaneously. At step 130, the location data received from the satellites and the assistance data received from at least one radio transmitter may be combined, from which location information is calculated at step 140. As stated above, the location information may include, for example, such items of information as the user's three-dimensional position, direction and speed of movement, and local time. At step 150, the location information may be outputted to an output device such as a display, audio system, and/or the like.

Referring again to FIGS. 1 and 2, additional features of the mobile telephone 10 will now be described. For the sake of brevity, generally conventional features of the mobile telephone 10 will not be described in great detail herein.

Mobile telephone 10 has a display 14 viewable when the clamshell telephone is in the open position. The display 14 displays information to a user regarding the various features and operating state of the mobile telephone 10, and displays visual content received by the mobile telephone 10 and/or retrieved from a memory 45. Display 14 also may be used to display location information in accordance with embodiments of the present invention.

A keypad 18 provides for a variety of user input operations. For example, keypad 18 typically includes alphanumeric keys for allowing entry of alphanumeric information such as telephone numbers, phone lists, contact information, notes, etc. In addition, keypad 18 typically includes special function keys 17 such as a "send" key for initiating or answering a call, and others. The special function keys 17 may also include various keys for navigation and selection operations to access menu information within the mobile telephone 10. As shown in FIG. 1, for example, the special function keys may include a five-way navigational ring containing four directional surfaces and a center button that may be used as an "enter key" selection button. Keypad 18 may be used to activate and access features of the navigation system of the present invention. Some or all of the keys may be used in conjunction with the display as soft keys. Keys or key-like functionality also may be embodied as a touch screen associated with the display 14.

The display 14 may be coupled to the control circuit 41 by a video processing circuit 54 that converts video data to a video signal used to drive the various displays. The video processing circuit 54 may include any appropriate buffers, decoders, video data processors and so forth. The video data may be generated by the control circuit 41, retrieved from a video file that is stored in the memory 45, derived from an incoming video data stream received by the radio circuit 48 or obtained by any other suitable method. A media player 63 within the mobile telephone may be used to play audiovisual files stored in memory or streamed over a network.

The mobile telephone 10 also may include a local wireless interface 66, such as an infrared transceiver and/or an RF adaptor (e.g., a Bluetooth adapter), for establishing communication with an accessory, another mobile radio terminal, a computer or another device. For example, the local wireless interface 66 may operatively couple the mobile telephone 10 to a headset assembly (e.g., a PHF device) in an embodiment where the headset assembly has a corresponding wireless interface. The mobile telephone 10 also may include an I/O interface 56 that permits connection to a variety of I/O conventional I/O devices. One such device is a power charger that can be used to charge an internal power supply unit (PSU) 58.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

The invention claimed is:

1. An electronic device comprising:
   a location data receiver for receiving location data from at least one satellite;
   a radio receiver for receiving a continuously broadcasted radio transmission of assistance data from at least one radio transmitter, the assistance data comprising a navigation message received from the at least one satellite; and a controller, wherein the controller combines the location data and the assistance data to calculate location information relating to the electronic device.

2. The electronic device of claim 1, wherein the location data receiver is a Global Positioning System (GPS) receiver.

3. The electronic device of claim 1, wherein the radio receiver includes a Radio Data System (RDS) receiver for receiving an RDS feed associated with a continuously broadcasted FM radio station.

4. The electronic device of claim 1, wherein the electronic device is a mobile telephone.

5. The electronic device of claim 1, wherein the location information comprises at least one of the electronic device's three-dimensional position, direction of movement, speed of movement, or local time.

6. A navigation system comprising:

a plurality of satellites for transmitting location data;

at least one radio transmitter comprising a first location data receiver for receiving at least one navigation message from the plurality of satellites, wherein the radio transmitter continuously broadcasts a radio transmission of assistance data comprising the at least one navigation message received from the plurality of satellites; and an electronic device comprising a second location data receiver for receiving location data from the plurality of satellites, a radio receiver for receiving the continuously broadcasted radio transmission of assistance data from the at least one radio transmitter, and a controller, wherein the controller combines the location data and the assistance data to calculate location information relating to the electronic device.

7. The navigation system of claim 6, wherein the first location data receiver and the second location data receiver are Global Positioning System (GPS) receivers.

8. The navigation system of claim 6, wherein the at least one radio transmitter further comprises a Radio Data System (RDS) transmitter, and the radio transmitter transmits the assistance data as an RDS feed associated with a continuously broadcasted FM radio station; and the radio receiver of the electronic device includes an RDS receiver for receiving the RDS feed of assistance data from the at least one radio transmitter.

9. The navigation system of claim 6, wherein the electronic device is a mobile telephone.

10. The navigation system of claim 6, wherein the location information comprises at least one of the electronic device's three-dimensional position, direction of movement, speed of movement, or local time.

11. The navigation system of claim 6, wherein the at least one radio transmitter comprises a plurality of radio transmitters.

12. The navigation system of claim 11, wherein the radio receiver of the electronic device receives a continuously broadcasted radio transmission of assistance data from the radio transmitter for which a strongest signal is detected by the radio receiver as compared to transmission signals of the others of the plurality of radio transmitters.

13. The navigation system of claim 11, wherein the radio receiver of the electronic device receives a continuously broadcasted radio transmission of assistance data from each of the plurality of radio transmitters within a signal reception range of the radio receiver.

14. A method of generating location information relating to an electronic device comprising the steps of:

receiving in the electronic device location data from a plurality of satellites;

receiving in the electronic device a continuously broadcasted radio transmission of assistance data from at least one radio transmitter, the assistance data comprising a navigation message received from the plurality of satellites;

combining in the electronic device the location data received from the plurality of satellites and the assistance data received from the radio transmitter; and calculating in the electronic device location information relating to the electronic device from the combined location data and assistance data.

15. The method of generating location information of claim 14, wherein the received continuously broadcasted radio transmission of assistance data from the at least one radio transmitter is a Radio Data System (RDS) feed associated with a continuously broadcasted FM radio station.

16. The method of generating location information of claim 14, wherein the at least one radio transmitter comprises a plurality of radio transmitters, and the step of receiving a continuously broadcasted radio transmission of assistance data further comprises:

scanning a signal reception range of the electronic device for radio transmitters located within the signal reception range;

determining which of the plurality of radio transmitters has a strongest transmission signal as compared to transmission signals of the others of the plurality of radio transmitters; and receiving the radio transmission of the assistance data from the radio transmitter having the strongest transmission signal.

17. The method of generating location information of claim 14, wherein the at least one radio transmitter comprises a plurality of radio transmitters, and the step of receiving a continuously broadcasted radio transmission of assistance data further comprises:

scanning a signal reception range of the electronic device for radio transmitters located within the signal reception range;

receiving a radio transmission of assistance data from each radio transmitter that is located within the signal reception range; and combining the assistance data received from the radio transmitters.

18. The method of generating location information of claim 14, wherein the assistance data includes ephemeris data relating to orbital positions of the plurality of satellites.

19. The method of generating location information of claim 14, wherein the step of calculating the location information comprises calculating least one of the electronic device's three-dimensional position, direction of movement, speed of movement, or local time.

20. The method of generating location information of claim 14 further comprising outputting the location information to an output device.

* * * * *